United States Patent [19]

Toyama et al.

[11] 3,992,168

[45] Nov. 16, 1976

[54] HEAT EXCHANGER WITH RECTIFICATION EFFECT

[75] Inventors: Akira Toyama, Kobe; Yukio Nakako, Nishinomiya; Toshio Kanazawa, Kobe, all of Japan

[73] Assignee: Kobe Steel, Ltd., Japan

[22] Filed: Apr. 17, 1974

[21] Appl. No.: 461,510

Related U.S. Application Data

[63] Continuation of Ser. No. 189,248, Oct. 14, 1971, abandoned, which is a continuation of Ser. No. 825,905, May 19, 1969, abandoned.

[30] Foreign Application Priority Data

May 20, 1968 Japan.................................. 43-34165

[52] U.S. Cl........................................ 62/42; 62/36; 165/166
[51] Int. Cl.² ............................................. F25J 3/02
[58] Field of Search .................. 62/36, 37; 165/140, 165/166, 7

[56] References Cited
UNITED STATES PATENTS

| | | | |
|---|---|---|---|
| 2,703,700 | 3/1955 | Simbelaar | 165/166 |
| 3,256,704 | 6/1966 | Becker | 62/42 |
| 3,282,334 | 11/1966 | Stahlheber | 165/166 |
| 3,310,105 | 3/1967 | Butt | 165/166 |
| 3,380,517 | 4/1968 | Butt | 165/166 |
| 3,559,722 | 2/1971 | Schauls | 165/166 |
| 3,860,065 | 1/1975 | Schauls | 165/166 |

*Primary Examiner*—Charles J. Myhre
*Assistant Examiner*—T. W. Streule
*Attorney, Agent, or Firm*—Bierman & Bierman

[57] ABSTRACT

In a heat exchanger comprising a plurality of first heat-transfer elements (A) for a fluid of higher temperature and second heat-transfer elements (B) for a fluid of lower temperature joined alternately and adjacently and a suitable number of appropriately shaped fins disposed within said elements and wherein the heat exchange is performed between the fluid ($a$) of higher temperature and the fluid ($b$) of lower temperature and at least the fluid ($a$) is changed in phase during the heat exchange, the improvement of providing such a heat exchanger with the ability to rectify the condensate from the fluid ($a$) and to recover the rectified liquid, wherein the fins in the lower part of the element (A) are so arranged that the fluid ($a$) entering from a port into the element (A) flows upwards smoothly with contact with the liquid condensed from the fluid ($a$) at the upper part of the element (A), which flows down through the heat exchanger. The condensed liquid flows down through the fins and is taken out from a port provided at the lowest part of the element (A). Accordingly, condensation of a gaseous fluid and rectification of the resulting condensate are both performed with high efficiency in the same apparatus.

20 Claims, 6 Drawing Figures

HEAT EXCHANGER WITH RECTIFICATION EFFECT

This is a continuation of application Ser. No. 189,248, filed Oct. 14, 1971 which is in turn a continuation-in-part of application Ser. No. 825,905, filed May 19, 1969, both now abandoned.

The present invention relates to a heat exchanger with rectification effect. More particularly, it relates to a partial condensation evaporator constructed of fins and plates joined to one another in which two fluids (e.g., gas and gas, gas and liquid, or gas and gas-liquid) of different temperatures flow counterwise and at least the fluid of higher temperature undergoes a phase-change with rectification in the heat exchange process.

For separation and recovery of a gas (e.g., hydrogen) from its mixture with any other gas (e.g., purse gas in the ammonia synthesis, off gas in the purification of petroleum, or coke oven gas), there have been broadly adopted heat exchangers which perform the function of heat exchange, because such apparatus is economically advantageous at the industrial scale and can afford the desired gas of higher purity in comparison with devices which utilize adsorption or diffusion.

In the known heat exchangers, the separation and recovery of a gas from its mixture with any other gas is ordinarily accomplished on the basis of a difference in the volatility of each component which constitutes the gaseous mixture, i.e., by condensing and separating the components other than the desired gas, however, in such a case, a rectification effect on the condensate is not obtained. In order to rectify the condensate, a separate rectification apparatus is thus required for use together with the heat exchanger.

A main object of the present invention is to provide a heat exchanger which has the same fundamental structure as the conventional heat exchangers and which performs the partial condensation of a gaseous mixture as well as the rectification of the resulting condensate without any additional equipment. Another object of this invention is to provide a heat exchanger of compact type which can perform the partial condensation of a gaseous mixture together with the rectification of the resulting condensate. Another object of the invention is to provide a heat exchanger for the continuous treatment of a gaseous mixture which has high separation and rectification efficiencies. A further object of the invention is to provide a heat exchanger that operates without depression of the flooding limit in the rectification process. A still further object of the invention is to provide a heat exchanger suitable for the economic separation and recovery of light gases such as hydrogen and helium in high purity from light gas-containing gaseous mixtures as well as the rectification and recovery of one or more useful components of higher boiling points in high concentrations from the partial condensate of the gaseous mixture.

The various features of novelty which characterize this invention are pointed out with particularity in the claims annexed hereto and forming a part of this specification. For a better understanding of the invention, however, and the advantages and specific objects obtained with its use, reference should be had to the accompanying drawings and descriptive matter in which have been illustrated and described a preferred embodiment of the invention.

Figure 1:
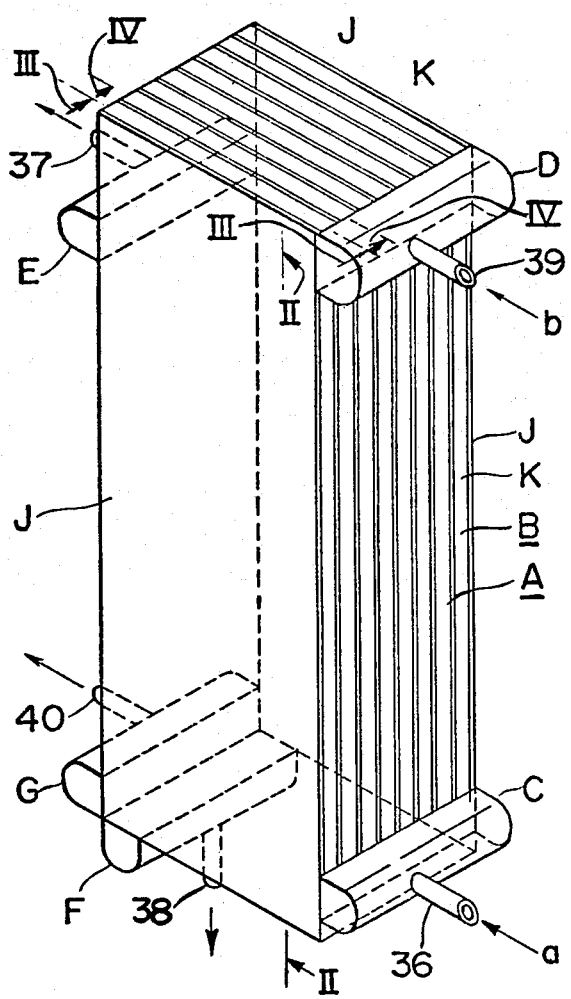
FIG. 1 is a perspective view showing the outline of the external structure of a heat exchanger embodying the invention.
Figure 2:
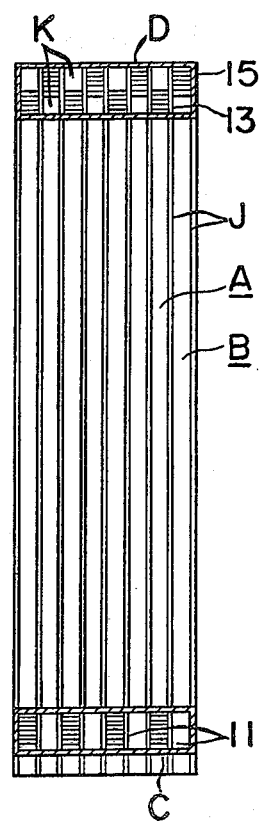
FIG. 2 is a side view, partly in section taken upon the line II — II of FIG. 1, showing the outline of the combination of a heat-transfer element for the fluid of higher temperature with a heat-transfer element for the fluid of lower temperature.
Figure 3:
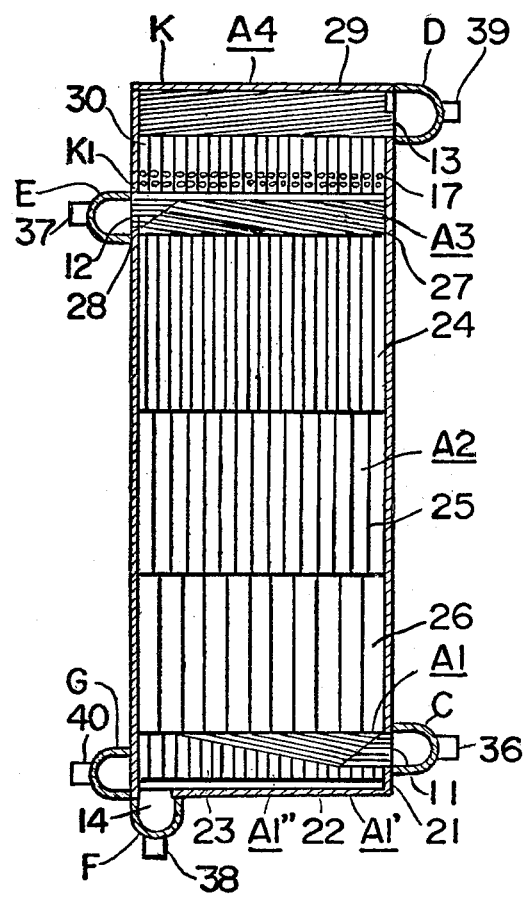
FIG. 3 is a sectional view taken upon the line III — III of FIG. 1, showing the outline of the inner structure of the heat-transfer element for the fluid of higher temperature.
Figure 4:
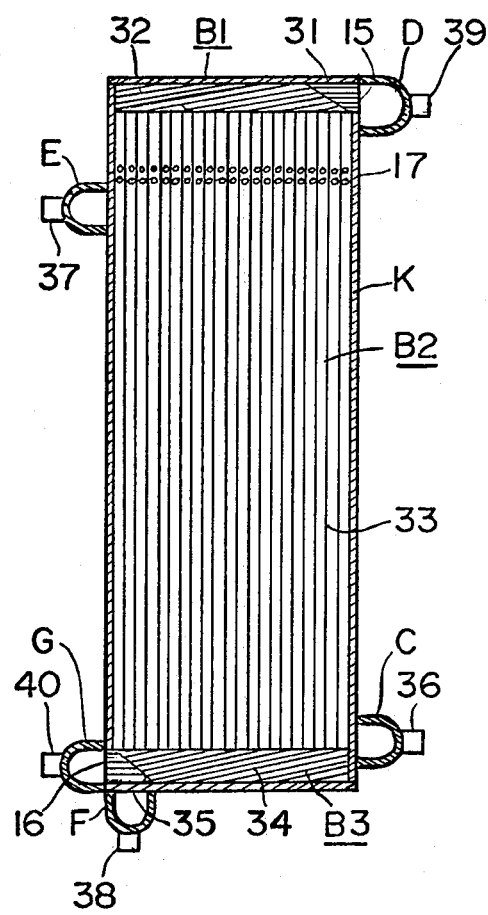
FIG. 4 is a sectional view taken upon the line IV — IV of FIG. 1, showing the outline of the inner structure of the heat-transfer element for the fluid of lower temperature.
Figure 5:
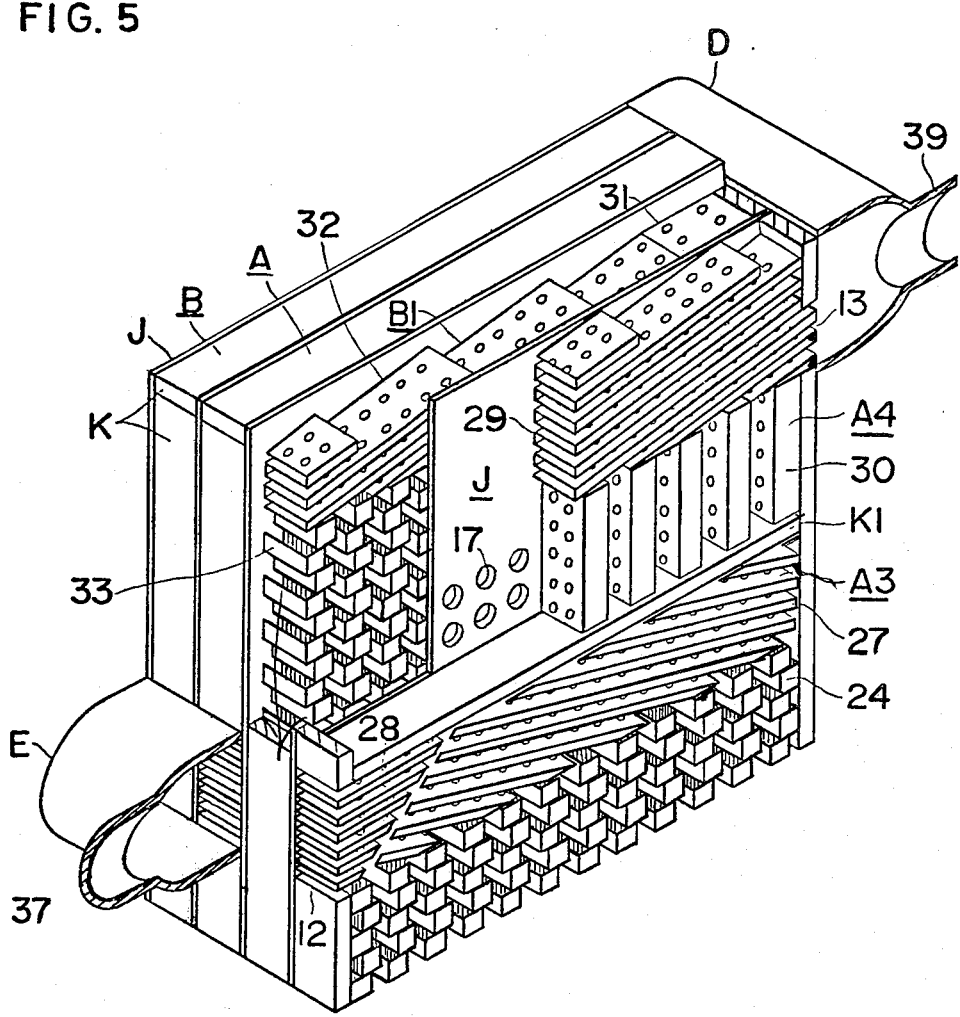
FIG. 5 is a perspective view, partly cut off, of the upper half portion of the heat exchanger as shown in FIG. 1.
Figure 6:
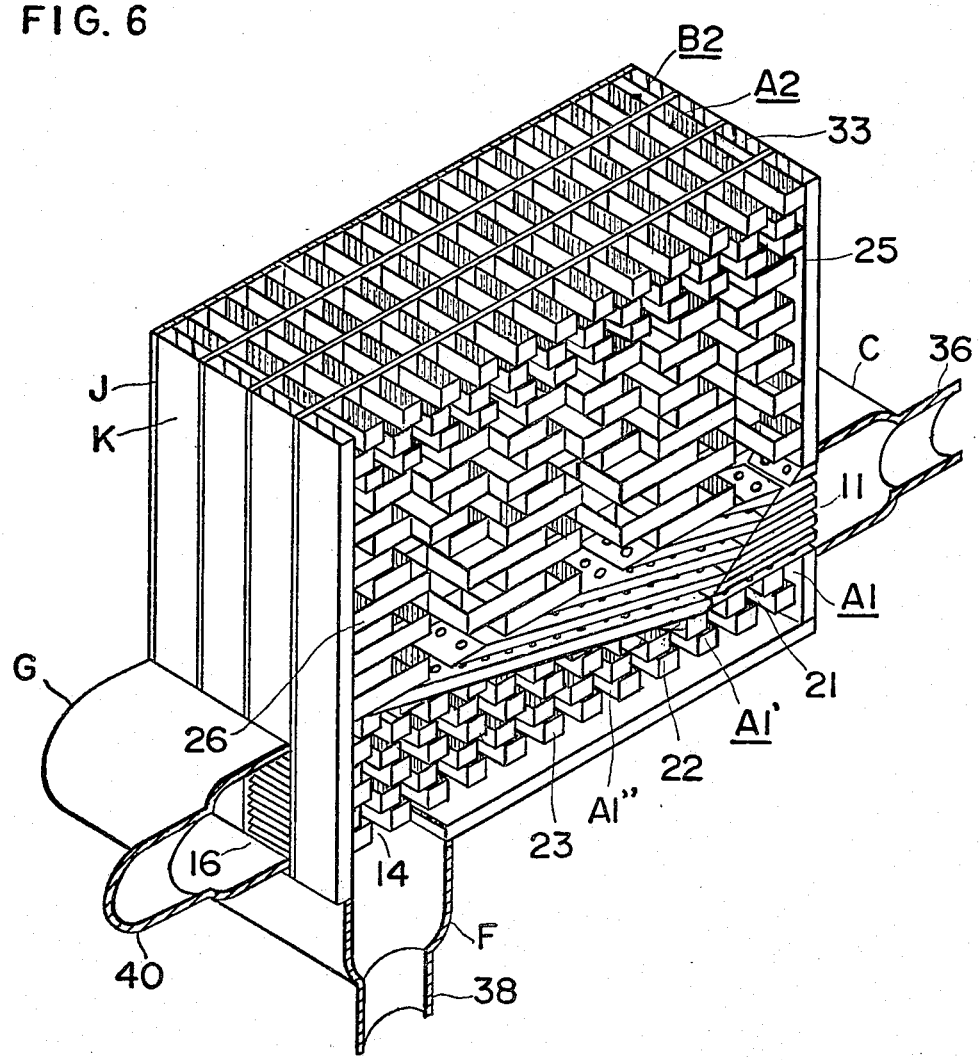
FIG. 6 is a perspective view, partly cut off, of the lower half portion of the heat exchanger as shown in FIG. 1.

Referring to the drawings wherein the capital Roman letters represent the principal constituents of a heat exchanger embodying the invention, the numerals represent the constituent parts of the heat exchanger and the letters and numerals identify the same parts throughout the Figures, the heat exchanger comprises a heat-transfer element (A) for the fluid of higher temperature and a heat-transfer element (B) for the fluid of lower temperature. Thus, the principal and essential part of the heat exchanger is constituted with a plurality of the elements (A) and (B) joined alternately and adjacently.

Although a variety of the combination of two fluids can be considered for the fluids flowing in the elements (A) and (B), the most ordinary is a gaseous fluid for the element (A) and a gaseous, liquid or gas-liquid fluid for the element (B), and the following descriptions will be made on such a case for the convenience of illustration.

The element (A) comprises three portions (A1), (A2) and (A3), above which the portion (A4) as a part of the element (B) is provided. The element (B) comprises three portions (B1), (B2) and (B3). In each of the portions, there are arranged suitably formed fins at appropriate locations. The elements (A) and (B) are separated from each other by plates (J) and are bonded with partitions (K), which separate each passage from the environment and also the passage for a fluid from another passage for a different fluid. The plates (J) and the partitions (K) are brazed in an air-tight manner and enclose the fins therein. The partitions (K) are partly cut off to form ports 11 to 16 available as fluid entrances or fluid exists, which communicate with fluid distributing boxes (C) and (D) or fluid collecting boxes (E), (F) and (G).

Illustrating in detail the construction of the heat-transfer element (A) for the higher-temperature fluid, it is divided into three postions, i.e. the portion (A1) wherein the higher temperature fluid (a) is introduced from the fluid distributing box (C) into the heat exchanger through the port 11 and the rectified liquid is separated from the fluid (a) being introduced, the portion (A2) wherein the fluid from the portion (A1) is subjected to heat exchange and the condensed liquid is rectified, and the portion (A3) wherein the gaseous fluid after separation of the condensed liquid is guided to the fluid collecting box (E) through the port 12.

Above the portion (A3), there is provided the portion (A4), being divided from the portion (A3) by the partition (K'), wherein a liquid part of the lower temperature fluid (b) is introduced from the fluid distributing box (D) into the heat exchanger through the port 13.

The portion (A1) is further divided into two sections, i.e., the sections (A1') and (A1''). In the section (A1'), at least one perforated fin 21 is provided close to the port 11 in such a manner that the flat surfaces of the fins are disposed horizontally and both sides of the turned-up portions are brazed with the plates (J), (J) and, also, at least one perforated fin 22 is provided adjacent to the fin 21 in such a manner that the flat surfaces of the fins are inclined with an elevation departing from the port 11 and both sides of the turned-up portions are brazed with the plates (J), (J). In the section (A1'') located under the section (A1'), serrulated fins 23 are arranged in such a manner that the fins are laid vertically in the width direction, the turned-up portions of each fin being shifted in relation to those of the upper and lower fins provided adjacently one to another, and both sides of the turned-up portions are brazed with the plates (J), (J), whereby the condensed liquid flows downwardly. The lowest portion of the section (A1'') is vacant so that the liquid which has flowed down is collected and introduced into the fluid collecting box (F) through the port 14. Alternatively, the fins 23 arranged in the section (A1'') may take the shape of the fins 21 and 22, and not the serrulated shape as mentioned above. In this case, the flat surfaces of the fins will be arranged vertically. The portion (A1) plays the roles of introducing the fluid (a) into the portion (A2) with facility and also of taking out the liquid condensed and rectified at the portion (A2).

The portion (A2) located above the portion (A1) is divided into several parts, for example, three parts, i.e., the upper part, the middle part and the lower part, depending on the pitch of the turned-up portions of the corrugated fins 24, 25 and 26 as being serrulated fins, perforated fins or straight fins arranged therein. The fins 24, 25 and 26 are arranged adjacently and are disposed vertically in the width direction and both sides of their turned-up portions are brazed with the plates (J), (J), the pitches of the fins 24, 25 and 26 being narrow to large in this order from the upper toward the lower part of the heat exchanger. When the pitch of the fins 24 is taken as 1, the respective pitches of the fins 25 and of the fins 26 may be, for instance, 2 and 3, as a general order of magnitude. The specific ratio of pitch employed depends upon the specific use for the heat exchanger and the amount of liquid and gas therein. The heat transfer coefficient is also an important parameter for deciding the particular shape and size of the fins. In the portion (A2), the fluid (a) flows up from the portion (A1) and a part of this fluid is condensed by heat exchange with the fluid (b) which is flowing down, and the rectification is performed between the condensed liquid flowing downwards and the fluid flowing upwards. The said peculiar arrangement of the fins having different pitches in the portion (A2) is effective in carrying out the rectification in a high efficiency while preventing the occurence of the flooding phenomenon resulting from the contact of the condensed liquid flowing down and the fluid flowing up and may be usually so designed that the rectification process is practiced with around 70 – 80% of the limit that induces flooding in any part of the portion (A2) under the operating conditions employed.

The portion (A3) located above the portion (A2) serves for the easy introduction of the gaseous fluid after separation of the condensed liquid into the port 12. In the portion (A3), at least one fin 27 having the same structure as fin 22 is brazed with the plates (J), (J) in such a manner that the flat surface of the fin is inclined with an elevation approaching to the port 12. Also, at least one fin 28 provided near the port 12 and having the same structure as fin 21 is brazed with the plates (J), (J) in such a manner that the flat surface of the fin is kept in a horizontally disposed position.

Above the portion (A3), the partition (K') is fixed so as to divide therefrom the portion (A4), which is a part of the element (B) for the lower temperature fluid and which functions to uniformly distribute fluid (b) in the apparatus of the invention. The portion (A4) communicates with the port 13 provided at the highest part of the element (A). In the upper half part of the portion (A4), at least one fin 29 having the same constitution as fin 21 is brazed with the plates (J), (J) in such a manner that the flat surfaces of the fins are inclined with a descent that is distant (slopes away) from port 13. In the lower half part, perforated fins 30 with an enlarged pitch in comparison with the pitch of the fins 29 are so arranged that the flat surfaces thereof are disposed perpendicularly, and the turned-up portions of the fins are brazed with the plates (J), (J). On the plates (J), (J), there are provided a number of perforations 17 at the positions corresponding to the lower part of the portion (A4).

In the heat exchanger as shown, the port 13 is provided at a slightly lower position than the port 15, the latter communicating directly to the portion (B1) of the element (B). When a fluid of gas-liquid phases is used as the fluid (b), the liquid fluid (b) flows into the portion (A4) through the port 13 and passes into the element (B) via the perforations 17. Since the perforations 17 are provided suitably in size and number so as to maintain a certain depth of the liquid fluid, i.e., a certain static pressure head, the quantity of fluid from the portion (A4) into the element (B) can be made uniform.

Illustrating in detail the construction of the element (B), it is divided into three portions, i.e., the portion (B1) wherein the fluid (b) is introduced from the box (D) into the heat exchanger through the port 15, the portion (B2) wherein the fluid flowing down from the portion (B1) is subjected to heat exchange and the portion (B3) wherein the fluid after heat exchange is conducted to the fluid collecting box (G) through the port 16.

The portion (B1) is located at the upper part of the element (B) and accommodates, close to the port 15, at least one fin 31 having the same construction as fin 21 which is brazed with the plates (J), (J) in such a manner that the flat surfaces thereof are disposed horizontally and, apart from the port 15, at least one fin 32 is constructed in the same manner as fin 31 and is brazed with the plates (J), (J) in such a manner that the flat surfaces thereof are inclined with a descent departing (away from) from port 15.

The portion (B2) located below the portion (B1) is the principal part wherein the heat exchange between the fluid (b) and the fluid (a) is performed and accommodates the corrugated fins 33 having the same construction as fins 24, 25 or 26 to form a number of paths for the liquid (b). On the plates (J), (J), there are provided the said perforations (17) at the positions corresponding to the upper part of the portion (B2), and the fluid in liquid phase comes into the portion (B2) through the perforations (17), flows downwards on the surface of the plates (J), (J) and the fins 33, is vaporized by heat exchange with the fluid from the element (A) and then flows down together with the gaseous fluid from the portion (B1).

The portion (B3) located below the portion (B2) serves for introducing the fluid flowing down into the box (G) and accommodates fins 34 having the same construction as fins 31, which are brazed with the plates (J), (J) in such a manner that the flat surfaces thereof are inclined with a descent approaching to the port 16 and, also, close to the port 16, fins 35 having the same construction as fins 34 are brazed with the plates (J), (J) in such a manner that the flat surfaces thereof are disposed horizontally.

The gaseous fluid after the completion of heat exchange at the portion (B2) increases in quantity as it flows downwards, and the pitches of the fins 33, 34 and 35 in the portions (B2) and (B3) may be so designed as to be suitable for such an increase.

In the heat exchanger as shown, each constituent of the elements (A) and (B) such as the fins, the plates (J), (J) and the partitions (K), (K") is usually made of an aluminum alloy and all of these elements are combined with a brazing agent for the aluminum alloy in order to form a unitary body.

The practical operation of the said heat exchanger will be hereinafter illustrated in detail taking as an example the application of the apparatus of the invention to the treatment of purge gas in the ammonia synthesis.

Purge gas of 135 atmospheric pressure and 275° to 279° K is expanded to an absolute atmospheric pressure of 40 and is cooled to around 120° K, is introduced into the box (C) through the pipe 36 and is sent uniformly to the portion (A1) of each of the elements (A). The fluid flowing in the portion (A1) is conducted by the portion (A1') into the portion (A2). At the portion (A2), the fluid is indirectly heat exchanged with a counter-flowing, cooling fluid in the element (B) to cool it to around 65° K, whereby most of the methane and argon and some of the nitrogen are partially condensed. The fluid which is now high in the concentration of gaseous hydrogen reaches to the portion (A3) and is then introduced into the box (E) through the port 12. From the box (E), the fluid may be supplied through pipe 37 to any other heat exchanger or plant. If necessary, a part of the fluid may be expanded by an expansion valve so as to produce a desired coldness and utilized as the fluid in the element (B). On the other hand, the liquid partially condensed at the portion (A2) flows down along the fins 24, 25 and 26 to contact efficiently with the elevating fluid whereby rectification proceeds. When the condensed liquid reaches to the higher part of the portion (A1), it is further rectified efficiently with the fluid which has just come from the box (C) to afford a condensate containing an abundant proportion of methane which is of a high boiling point. The condensate flowing down on the fins 22 in the portion (A1') is inclined to flow naturally in the direction of the port 11 along with the arrangement of the fins 22 but is pushed back by the fluid entering from the port 11 in the inner direction. On reaching to the perforations of the fins 22, the condensate flows down to the portion (A1") due to gravity and enters into the box (F) through the port 14. Due to the peculiar arrangement of the fins 22 in the portion (A1'), the fluid from the port 11 pushes back inwardly the condensed liquid which has flowed down and itself flows upwards without flowing into the portion (A1"). Since the fins 23 in the portion (A1") are constructed vertically to the flowing direction of the fluid from the port 11, the condensed liquid easily falls down into the portion (A1") without receiving any influence from the entering fluid. Thus, the separation of the entering fluid and the condensed liquid is accomplished smoothly at the portion (A1). The condensate containing predominantly components of higher boiling points comes into the box (F) and is sent to an expansion valve through the pipe 38 in which the condensate is expanded with production of a desired coldness and is utilized as the fluid for the element (B). The obtained condensate is a rectified liquid containing a component of a high boiling point, i.e., methane, and it may be used per se as an industrial material. Moreover, hydrogen of high purity or any other cold medium conventionally employed in heat exchangers may be used as the fluid for the element (B). The fluid of the element (B) is introduced into the box (D) through the pipe 39 and flows into the portions (B1) and (A4) through the ports 13 and 15. When a fluid in gas-liquid phases is used, the gas component enters into the portion (B1) through the port 15 and flows down to the portion (B2), while the liquid component enters into the position (A4) through the port 13, flows into the portion (B2) through the perforations 17 and then flows down together with the said gas component on the surface of the plates (J), whereby the heat exchange efficiency at the element (A) is increased. The fluid is made gaseous after performance of heat exchange in the portion (B2), flows into the box (G) via the portion (B3) and is recovered or abandoned through the pipe 40.

As can be understood from the above descriptions the heat exchanger of the present invention is advantageous in performing not only the condensation of a gaseous fluid but also the rectification of the resulting condensate in a high efficiency without any additional apparatus for the rectification. It is also advantageous that such a heat exchanger can be manufactured by making only slight modifications in the inner structure of conventional heat exchangers.

The heat exchanger of the invention has a high transfer area per unit volume. When constructed of aluminum or an aluminum alloy, it can be made with compactness, light weight and high efficiency. As is clear from the above discussion, the heat transfer is done through the plates and the fins. Some of the heat is transferred directly through the flat plates (primary heat transfer surface), but a greater part is transferred through the fins (secondary heat transfer surface). Thus, the particular construction of the heat exchanger of the present invention provides a high heat transfer surface per unit volume, making it possible to construct a smaller unit to do the required job. This is particularly true when the fins and plates are made of an anti-corrosion aluminum alloy because of the very high thermal conductivity of aluminum, but the principles of the invention are equally applicable to other heat-conducting metals. Basically, the heat exchanger of the invention can be used in many applications, for example, for air separation plants, waste gas heat recovery apparatus and various heat exchange processes in chemical plants and installations.

What is claimed is:

1. In a heat exchanger of the type comprising a plurality of combinations each of which includes
   a first heat transfer element and a second heat transfer element, said first element for carrying a first fluid of higher temperature and said second element for carrying a fluid of lower temperature,
   said elements being joined alternately and adjacently to each other,
   a plurality of fins in said elements wherein indirect heat exchange is performed between said first fluid and said second fluid whereby at least said first fluid is changed in phase, the improvement which comprises:
   a plurality of heat transfer regions in said first element located one above the other, the lowest of said regions containing a plurality of inclined and perforated fins therein, a first part for admitting said first element located in said lowest regions adjacent said inclined fins to permit said first fluid to enter said first element and travel up said first element to allow liquid to condense said first fluid upon heat exchange between said first and second fluids, said condensed liquid being subjected to the inflow of additional amounts of said first fluid, said condensed liquid being removed through said perforations while said first fluid flows along said inclined and perforated fins and into said first element, at least one second fin having a flat surface, said first fin being disposed horizontally adjacent to said first port and in fluid communication with said inclined fins, and a second port disposed on said first element and below said lowest region, and a plurality of additional fins in said first element in said lowest region for providing a longitudinal passage below said inclined and perforated fins and said second fins and above said second port for removal of condensate.

2. A heat exchanger according to claim 1, wherein the first element comprised a rectangular cube formed by a plurality of plates which separate it from the second element fringing the first element, said partitions containing said first and second ports, a third port disposed at the upper portion of said first element for discharging said first fluid.

3. A heat exchanger according to claim 2, wherein the second element comprises a rectangular cube formed by a plurality of plates which separate it from the first element, partitions fringing the second element, said partitions containing a fourth port for introducing said second fluid into the heat exchanger, and a fifth port for discharging said second fluid after heat exchange with said first fluid has taken place.

4. A heat exchanger according to claim 1, further comprising an upper portion above the first element with a horizontally disposed partition dividing it from the first element and a plate dividing said upper portion from the second element, a plurality of perforations being provided in the lower part of the plate which divides the first and second elements, said upper portion being further provided with a sixth port for introducing said second fluid into said upper portion, said upper portion providing additional indirect heat exchange between said second fluid and said first fluid contained in the upper portion of said first element.

5. A heat exchanger according to claim 4, wherein the first element including said upper portion comprises a rectangular cube formed by the plates which separate it from the second element and the partitions which fringe the first element and the upper portion, said partitions having the first and third ports for introducing and discharging the first fluid, the second port for discharging the rectified liquid and the sixth port for introducing the second fluid into said upper portion.

6. A heat exchanger according to claim 5, wherein the second element comprises a rectangular cube formed by the plates which separate it from the first element and the partitions which fringe the second element and the upper portion thereof, said partitions having said fifth port for discharging the second fluid, and said fourth port disposed on the same side and above said sixth port.

7. A heat exchanger according to claim 1, wherein the second fluid is in a gas-liquid phase.

8. A heat exchanger according to claim 1, wherein the first fluid is a gas and the second fluid is a gas, a liquid or a gas-liquid fluid mixture.

9. The heat exchanger according to claim 1, further comprising an upper portion provided above the first element having a horizontally disposed partition dividing it from the first element and a plate dividing said upper portion from the second element, a plurality of perforations being provided in the lower part of the plate which divides the first and second elements, said upper portion being further provided with a sixth port for introducing the second fluid into said upper portion, whereby condensation of said first fluid as well as rectification of the resulting condensate can be effected within said heat exchanger.

10. A heat exchanger according to claim 3, wherein the rectangular cubes are of substantially the same size.

11. A heat exchanger according to claim 6, wherein the rectangular cubes are of substantially the same size.

12. A heat exchanger according to claim 1, wherein said additional fins are inclined downwardly in the lower part of the first element.

13. A heat exchanger according to claim 1, wherein said heat exchange fins have different pitches from each other so as to effect the rectification of the condensed liquid at a condition relatively close to flooding.

14. A heat exchange according to claim 13, wherein the pitch of said exchange fins becomes larger from the upper toward the lower part of the first element.

15. A heat exchanger according to claim 14, wherein heat exchange fins having three different pitches are disposed in said first element.

16. A heat exchanger according to claim 1, wherein said plates and fins are made of aluminum or an aluminum alloy.

17. A heat exchanger according to claim 20, wherein the pitch of said heat exchange fins becomes larger from the upper toward the lower part of the first element.

18. A heat exchanger according to claim 17, wherein said plates and said fins are made of aluminum or an aluminum alloy.

19. In a heat exchanger comprising a plurality of first heat-transfer elements for a first fluid of high temperature and a plurality of second head-transfer elements for a second fluid of lower temperature than said first fluid, said first and second elements being positioned alternately adjacent and being separated by plates, a plurality of heat exchange fins disposed within said first and second elements, whereby indirect heat exchange occurs between the first fluid and the second fluid, at least said first fluid being changed in phase during the heat exchange, the fluid entrance and exit means, the improvement which comprises a first port provided in the lower part of the first element for introducing said first fluid to the heat exchanger, said port communicating with at least one first fin having a flat surface which is disposed horizontally adjacent to said first port, each of said first fins communicating with a second fin having a flat surface which is inclined upwardly away from said first port, said first and second fins serving to introduce said first fluid into the first element, a plurality of perforations being provided in said first and second fins for separating from said first fluid the liquid rectified by contact with the upflowing first fluid while the liquid condensed by indirect heat exchange in the first element flows down through the first element, and a second port disposed in an opposed position and below said lower port of the first element for discharging the resulting rectified liquid, a plurality of additional fins being provided above said second port but below said first and second fins, respectively, said additional fins providing a longitudinal passage below said first and second fins, said first element comprising a rectangular cube, a plurality of plates which form said cube and separate it from the second element, partitions fringing the first element and which contain said first and second ports, a third port disposed at the upper portion of said first element for discharging said first fluid, said second element comprising a rectangular cube, a plurality of plates which form said cube and separate it from the first element, partitions fringing the second element which contain a fourth port for introducing the second fluid into the heat exchanger, a fifth port for discharging the second fluid, said fourth port being disposed at the uppermost portion of the second element and said fifth port being disposed at the lower portion of the second element, said first element further including an upper portion above the first element with a horizontally disposed partition dividing it from the first element and a plate dividing said upper portion from the second element, a plurality of perforations being provided in the lower part of the plate which divides the first and second elements, said upper portion being further provided with a sixth port disposed on the same side and below said fourth port for introducing the second fluid into said upper portion, said first element including said upper portion within said rectangular cube, whereby condensation of said first fluid as well as rectification of the resulting condensate can be effected within said heat exchanger.

20. A heat exchanger according to claim 19, wherein the rectangular cubes are of substantially the same size.

* * * * *